United States Patent
Anrig et al.

(10) Patent No.: US 7,677,813 B2
(45) Date of Patent: Mar. 16, 2010

(54) ELECTRO-OPTICAL HYBRID CONNECTION ASSEMBLY

(75) Inventors: Martin Anrig, Sargans (CH); Dirk Bueche, Fanas (CH); Michael Sauerwein, Dornbirn (AT); Dieter Wildhaber, Berschis (CH); Hagen Zimer, Jena (DE); Carsten Ziolek, Seewis-Dorf (CH)

(73) Assignee: Trumpf Laser Marking Systems AG, Gruesch (CH)

( * ) Notice: Subject to any disclaimer, the term of this patent is extended or adjusted under 35 U.S.C. 154(b) by 0 days.

(21) Appl. No.: 12/138,809

(22) Filed: Jun. 13, 2008

(65) Prior Publication Data

US 2009/0028495 A1 Jan. 29, 2009

(30) Foreign Application Priority Data

Jun. 15, 2007 (EP) .................................. 07011761

(51) Int. Cl.
*G02B 6/38* (2006.01)
(52) U.S. Cl. ............................. 385/75; 385/39; 385/70; 385/71; 385/78; 385/85
(58) Field of Classification Search .................. 385/39, 385/53, 55, 59, 70–72, 75–78, 85; 439/577
See application file for complete search history.

(56) References Cited

U.S. PATENT DOCUMENTS

| 4,279,469 A | 7/1981 | Forman |
| 4,707,063 A | 11/1987 | Plummer |
| 4,896,939 A | 1/1990 | O'Brien |
| 5,448,676 A | 9/1995 | White et al. |
| 6,062,739 A | 5/2000 | Blake et al. |
| 6,599,025 B1 * | 7/2003 | Deutsch ........................ 385/75 |

FOREIGN PATENT DOCUMENTS

CA 2603668 10/2006

(Continued)

OTHER PUBLICATIONS

European Search Report for corresponding European Patent Application No. 07011761.9, mailed Nov. 27, 2007, 5 pages.

(Continued)

*Primary Examiner*—Frank G Font
*Assistant Examiner*—Michael P Mooney
(74) *Attorney, Agent, or Firm*—Fish & Richardson P.C.

(57) ABSTRACT

An electro-optical hybrid connection assembly provides an optical connection of at least a first optical fiber and a second optical fiber that define a fiber axis and an electrical connection of at least a first electrical conductor and a second electrical conductor. The assembly includes a first connector and a second connector. The first connector includes a first ferrule that encloses the first optical fiber, a centering sleeve surrounding the first ferrule and projecting beyond at least one end of the first ferrule, and at least one electrical plug-in contact connected to the first electrical conductor. The second connector includes a second ferrule enclosing the second optical fiber, and at least one electrical plug-in contact connected to the second electrical conductor. Each of the two optical fibers has a plane fiber end aligned at right angles to the fiber axis and provided with an anti-reflection coating.

20 Claims, 3 Drawing Sheets

FOREIGN PATENT DOCUMENTS

| | | |
|---|---|---|
| DE | 4208140 | 9/1993 |
| DE | 202005005362 | 6/2005 |
| GB | 2346269 | 8/2000 |
| WO | WO9819191 | 5/1998 |
| WO | WO03005088 | 1/2003 |

OTHER PUBLICATIONS

Office Action from the European Patent Office from corresponding European Patent Application No. EP 07 011 761.9-1234, mailed Oct. 9, 2008, 3 pages.

* cited by examiner

ELECTRO-OPTICAL HYBRID CONNECTION ASSEMBLY

CROSS REFERENCE TO RELATED APPLICATION

This application claims priority under 35 U.S.C. § 119(a) to European Application No. 07 011 761.9-1234, filed on Jun. 15, 2007, the entire contents of which are hereby incorporated by reference.

TECHNICAL FIELD

The present invention relates to an electro-optical hybrid connection assembly for the optical connection of at least a first and a second optical fiber and for the electrical connection of at least a first and a second electrical conductor.

BACKGROUND

Longitudinal diode end-pumped solid-state lasers stand out in terms of their high efficiency and a good beam quality. The ability to store relatively large quantities of energy at the same time enables the generation of millijoule pulses, with pulse durations of a few nanoseconds, by means of a Q-switch internal to the resonator. This means that such lasers are favored for the processing of materials. In particular, for laser engraving an excellent laser beam quality is indispensable in order to obtain a precise machining result. The generation of a stigmatic laser beam from the solid-state laser requires a stigmatic pump beam. The latter is in many instances generated in a process in which the strongly astigmatic and asymmetric beam parameter product of a diode laser bar is rendered symmetrical by means of beam shaper optics and finally is coupled into a multimode fiber by means of a spherical focusing lens. This fiber coupling fundamentally enables the spatial separation between the actual solid-state laser beam source, i.e., the solid-state laser resonator, and the pump light source. In particular, this spatial separation of solid-state laser resonator and pump light source is essential in the implementation of air cooled laser systems, in order to build highly compact laser heads of low weight, in which the solid-state laser resonator is located. The pump light source generates such a high heat output that large volume cooling elements of high weight are used. The removal of the pumped light source together with the necessary cooling unit to a separate power supply unit of the solid-state laser therefore enables a small volume structure for the actual laser head.

The optical connection between the power supply unit and the laser head is formed by means of the previously mentioned multimode fiber (for example, a glass fiber). In most cases, the interface between the power supply unit and the laser head is not defined solely in terms of the optical pump light connection. In fact, electrical data conductors are also used for the control of actuators in the laser head or for the transfer of sensor data. If another element that has to be controlled (e.g., a scanner) is located on the laser head then further electrical conductors are required. In other words, the laser head is connected both optically and also electrically to the power supply unit.

Electro-optical hybrid connection assemblies are used in avionics, in the telecommunications field, by the military, and in space travel. In hybrid connection assemblies, the optical interface is between single mode fibers with relatively small optical powers of typically 1-2 W and small fiber core diameters of about 7 to 50 μm. The "butt coupling" technology used in these hybrid connection assemblies with bent, uncoated fiber end surfaces functions well in this low power range.

Optical connection assemblies for optical fibers or optical wave guides are known. A known optical connector is the so-called F-SMA connector (also known as the SMA connector), which has been internationally standardized. The F-SMA connector takes the form of a screw-in connector in which the fiber is guided in a relatively long metallic ferrule with a pin diameter of 3.175 mm, and which is ground flat on the contact surface. The insertion loss that is achieved with this connector depends on a large number of criteria. Thus, for example, the damping in the case of light guides with a larger core diameter is significantly less than that for fibers of smaller diameter.

SUMMARY

In one general aspect, an electro-optical hybrid connection assembly provides an optical connection of at least a first optical fiber and a second optical fiber that define a fiber axis and an electrical connection of at least a first electrical conductor and a second electrical conductor. The assembly includes a first connector and a second connector. The first connector includes a first ferrule that encloses the first optical fiber, a centering sleeve surrounding the first ferrule and projecting beyond at least one end of the first ferrule, and at least one electrical plug-in contact connected to the first electrical conductor. The second connector includes a second ferrule enclosing the second optical fiber, and at least one electrical plug-in contact connected to the second electrical conductor. Each of the two optical fibers has a plane fiber end aligned at right angles to the fiber axis and provided with an anti-reflection coating. When the two connectors are assembled (that is, connected to each other), the second ferrule is inserted into the centering sleeve of the first connector such that the second ferrule abuts against the centering sleeve or the second ferrule abuts against the first ferrule, the fiber ends of the two optical fibers are separated from one another by a gap, and the plug-in contacts of the two connectors are plugged into one another in an electrically conducting manner.

Implementations can include one or more of the following features. For example, the gap that separates the two fiber ends can be an air gap.

At least one of the first and second ferrules can terminate flush with the fiber end of the respective fiber that it encloses. At least one of the first and second ferrules can project beyond the fiber end of the respective fiber that it encloses.

The second ferrule can include a stop that, the two connectors are assembled, butts against the centering sleeve of the first connector.

At least one of the first and second ferrules can project beyond the fiber end of the respective fiber that it encloses, and in the assembled state of the two connectors the end faces of the first and second ferrules butt against one another.

At least one of the ferrules or the centering sleeve can be guided such that it can move axially against the action of a spring. The second ferrule can be guided such that it can move axially against the action of a spring.

The centering sleeve can be a metallic shield. The centering sleeve can be made of stainless steel or brass. The hybrid connection assembly can also include a metallic shield surrounding the second ferrule.

The optical fibers can be multimode fibers. The optical fibers can be designed for optical powers of at least 10 W.

At least one of the two connectors can be attached to a hybrid cable that has at least one optical fiber and at least one electrical conductor.

In another general aspect, a laser system includes a power supply device, a connection assembly, and a laser head. The power supply device includes a pump light source that outputs a pump laser beam and an electronics unit that outputs one or more electrical signals. The connection assembly receives and transmits the pump laser beam from the pump light source and the one or more electrical signals from the electronics unit. The connection assembly includes a first connector including a first ferrule that encloses a first optical fiber that receives the pump laser beam output from the pump light source, a centering sleeve surrounding the first ferrule and projecting beyond at least one end of the first ferrule, and at least one electrical plug-in contact connected to a first electrical conductor through which the one or more electrical signals are transmitted, and a second connector including a second ferrule that encloses a second optical fiber and at least one electrical plug-in contact connected to a second electrical conductor. Each of the two optical fibers has a plane fiber end aligned at right angles to an axis of the fibers and when the first and second connectors are connected to each other, the second ferrule is inserted into the centering sleeve such that the second ferrule abuts against the centering sleeve or the first ferrule, the fiber ends of the optical fibers are separated from one another by a gap, and the plug-in contacts are plugged into one another in an electrically conducting manner. The laser head includes a laser beam source that receives the pump laser beam that has been transmitted through the second optical fiber and an electrical device that receives the one or more electrical signals that have been transmitted through the second electrical conductor.

Implementations can include one or more of the following features. For example, the laser system can include another connection assembly. The optical fibers can be multimode fibers. The optical fibers can be designed for optical powers of at least 10 W.

At least one of the two connectors can be attached to a hybrid cable that has at least one optical fiber and at least one electrical conductor.

The laser system can include a hybrid cable that includes the second optical fiber and the second electrical conductor, and a second connection assembly that receives the second optical fiber and the second electrical conductor of the hybrid cable and is designed identically to the connection assembly such that the first optical fiber and the first electrical conductor of the second connection assembly is fed to the laser beam source and the electrical device of the laser head.

The electro-optical hybrid connection assembly can be used for high optical powers, in particular, in multimode operation, of greater than about 10 W. The optical fibers can therefore be designed as multimode fibers and for high optical powers of at least 10 W.

The electro-optical hybrid connection assembly provides the optical connection of at least a first and a second optical fiber, and provides the electrical connection of at least a first and a second electrical conductor. The connection assembly includes a first connector and a second connector. The first connector includes a ferrule in which the first optical fiber is enclosed, a centering sleeve surrounding the ferrule, which projects beyond the ferrule, and at least one electrical plug-in contact connected to the first electrical conductor. The second connector includes a ferrule in which the second optical fiber is enclosed, and at least one electrical plug-in contact connected to the second electrical conductor. Each of the two optical fibers has a plane fiber end aligned at right angles to the fiber axis and is provided with an anti-reflection coating. In the assembled state of the two connectors, the ferrule of the second connector is inserted into the centering sleeve of the first connector up to the abutment against the centering sleeve, or on the ferrule of the first connector, the fiber ends of the two optical fibers are separated from one another by an air gap, and the plug-in contacts of the two connectors are plugged into one another in an electrically conducting manner.

In the electro-optical hybrid connection assembly, the fiber ends are configured to be plane and are provided with an anti-reflection coating as well as being separated from one another for the protection of the anti-reflection coatings. By means of this configuration, radiation losses at the optical interface can be minimized as far as possible, so that even in high power applications the destruction threshold of the components used is not exceeded.

In order to prevent damage to the at least one electrical conductor as a result of radiation emitting from at least one of the optical fibers, the optical fibers possess an integrated safety device. In the event of emission of radiation from the guidance area of the fibers this leads to the shutdown of the laser. This safety device is preferably based on the detection of alterations in resistance. In addition, the hybrid cable possesses an electrical conductor to check the correct positioning of the connector of the hybrid connection assembly. If the contacts of this electrical conductor are not plugged, no laser beam is enabled.

Further advantages of the invention can be extracted from the claims, the description and the drawing. The features mentioned above and below may be used individually or collectively in arbitrary combination. The embodiment shown and described is not to be understood as exhaustive enumeration but has exemplary character for describing the invention.

DETAILED DESCRIPTION

Figure 1:
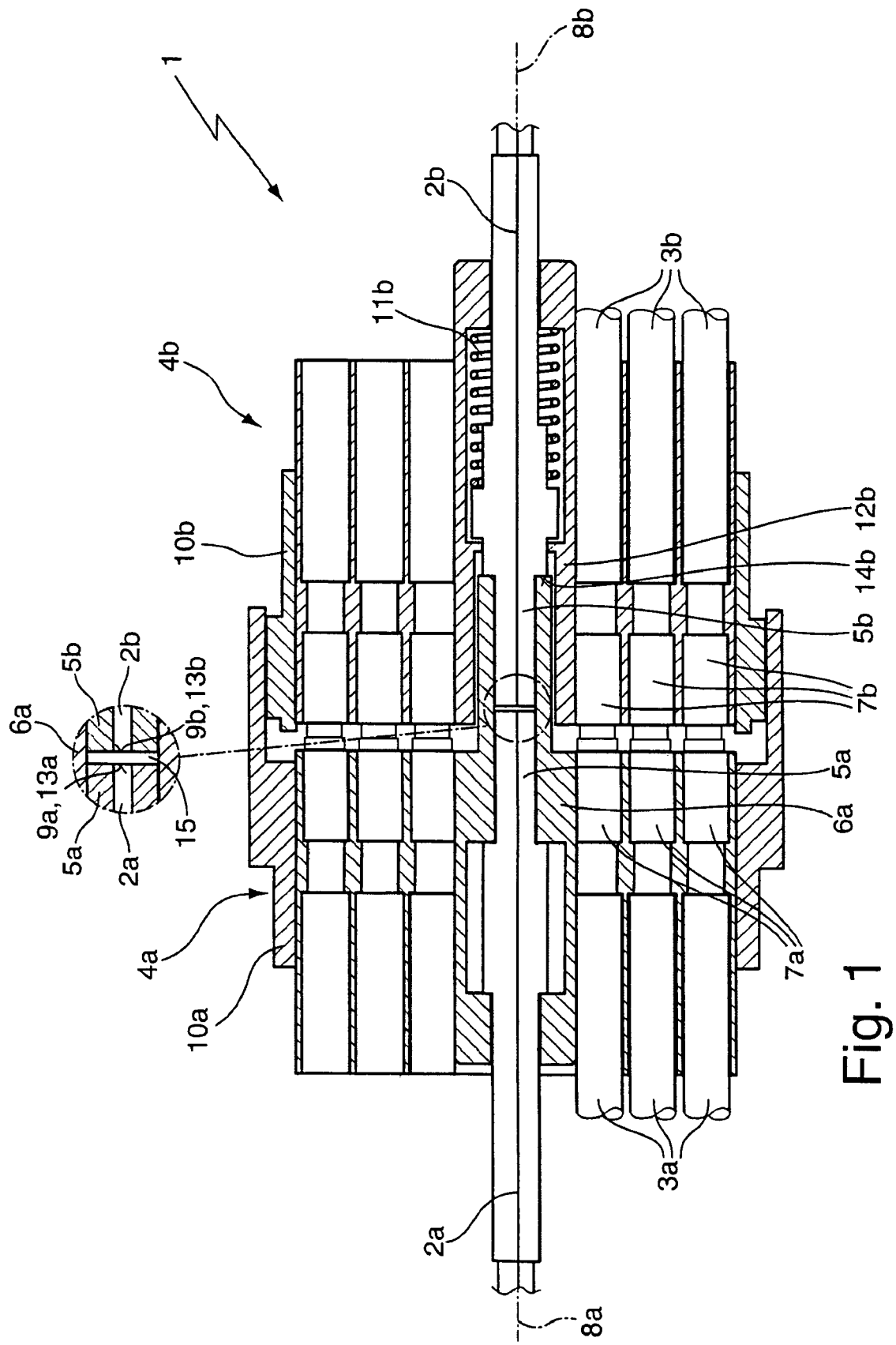
FIG. 1 is a cross-sectional view of an electro-optical hybrid connection assembly.

The electro-optical hybrid connection assembly 1 shown in FIG. 1 provides an optical connection between at least a first optical fiber (or optical waveguide) 2a and a second optical fiber (or optical waveguide) 2b, and provides an electrical connection between a plurality of first electrical conductors 3a and a plurality of second electrical conductors 3b with the aid of two connectors 4a, 4b that can be plugged into one another. The components of the first connector 4a are identified with "a", and the components of the second connector 4b are identified with "b". The first connector 4a has a housing 10a and the second connector 4b has a housing 10b that mates with the housing 10a.

The first connector 4a has a ferrule 5a, in which the first optical fiber 2a is enclosed, a centering sleeve 6a that surrounds and projects beyond at least one end of the ferrule 5a, and a plurality of electrical plug-in contacts 7a to which the first electrical conductors 3a are connected. The centering sleeve 6a can be made of any rigid material such as stainless steel or aluminum. The second connector 4b has a ferrule 5b that encloses the second optical fiber 2b, and a plurality of electrical plug-in contacts 7b to which the second electrical conductors 3b are connected. Each of the two optical fibers 2a, 2b has a plane fiber end 9a, 9b (see inset) that is aligned at right angles to a fiber axis 8a, 8b, and that terminates flush with an end of the ferrule 5a, 5b, respectively. The optical fibers 2a, 2b can be multimode fibers with fiber core diameters of at least about 0.1 mm and designed for maximum optical powers of at least about 10 W.

While the ferrule 5a is mounted in a fixed manner in the connector housing 10a of the first connector 4a, the ferrule 5b is guided in the connector housing 10b of the second connector 4b such that it can move axially along the fiber axis 8b, and by means of a spring 11b the ferrule 5b is biased in the direction towards an interface between the ferrules 5a and 5b (the connector interface), i.e., in FIG. 1 to the left. The ferrule 5a is shielded to the outside by the centering sleeve 6a, and the ferrule 5b is surrounded by a shield 12b, which can be metallic and can be referred to as a metal sleeve. The plane fiber ends 9a, 9b of the two optical fibers 2a, 2b are provided with a dielectric anti-reflection coating 13a, 13b, as shown in the inset of FIG. 1.

When the connectors 4a, 4b are fully plugged into one another, as shown in FIG. 1, the ferrule 5b of the second connector 4b is inserted into the centering sleeve 6a of the first connector 4a to the extent that an end face or a stop 14b of the ferrule 5b, here designed as an annular step, butts against an end face of the centering sleeve 6a and between the two ferrules 5a, 5b and also between the fiber ends 9a, 9b there remains a predetermined air gap 15 of, for example, about 5-500 μm for typical fiber core diameters of 100-800 μm with the same numerical aperture (NA). The air gap 15 prevents mechanical or physical contact between the fiber ends 9a, 9b and damage to their respective anti-reflection coatings 13a, 13b. By means of the spring 11b, the ferrule 5b of the second connector 4b is held in abutment against the centering sleeve 6. When the connectors 4a, 4b are completely plugged into one another (in part, by mating the housings 10a and 10b with each other), the centering sleeve 6a is inserted into the metal sleeve 12b and the plug-in contacts 7a, 7b of the two connectors 4a, 4b are also plugged into one another in an electrically conducting manner. By means of this hybrid connection assembly 1, radiation losses at the optical interface can be minimized or reduced as much as possible, so that even in high power applications the destruction threshold of the components used is not exceeded.

Figure 2:
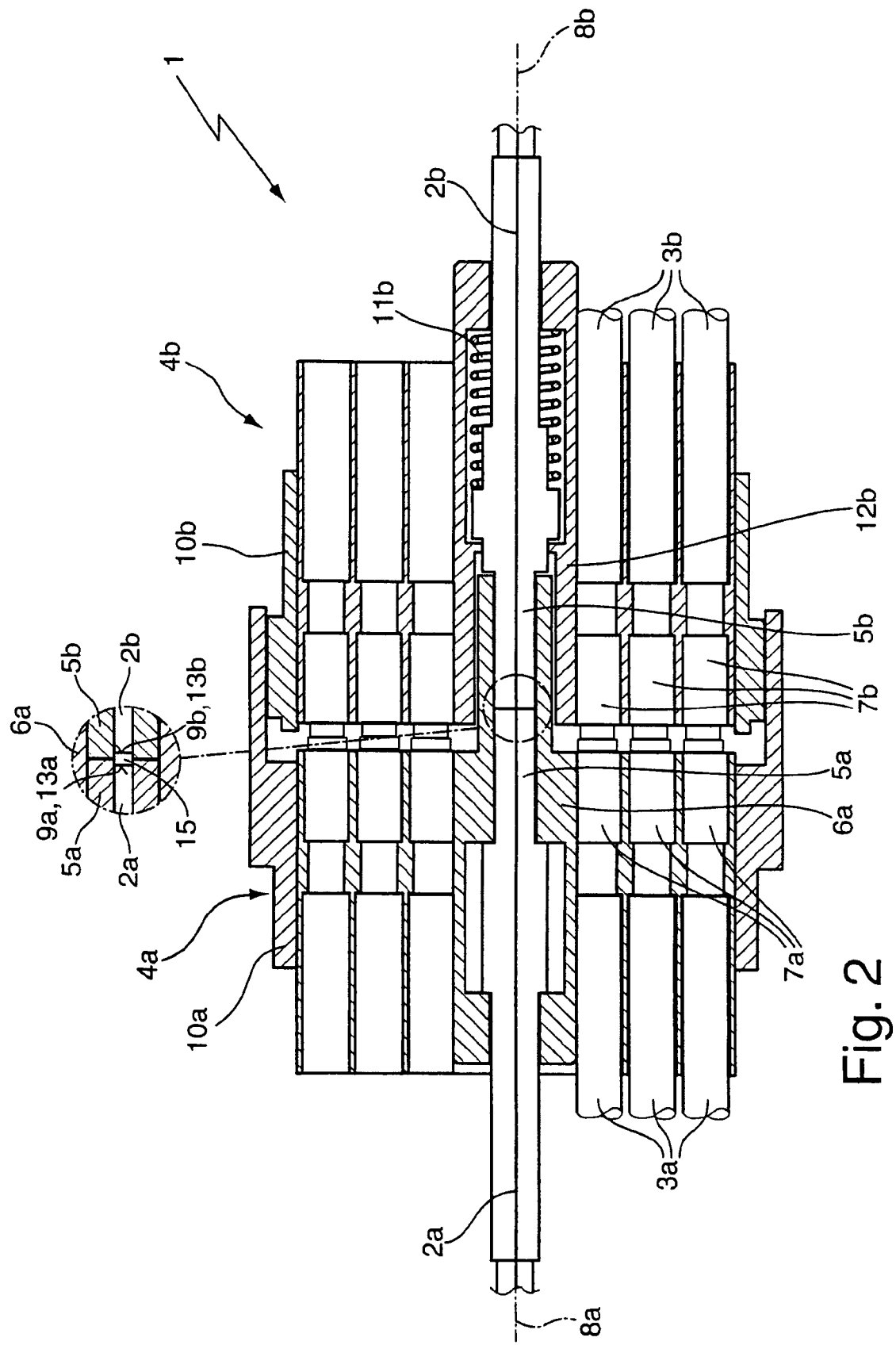
FIG. 2 is a cross-sectional view of another implementation of an electro-optical hybrid connection assembly.

The electro-optical hybrid connection assembly 1 shown in FIG. 2 differs from the hybrid connection of FIG. 1 simply in that here at least one, preferably both, the ferrules 5a, 5b project beyond their respective fiber ends 9a, 9b, in that the ferrule 5b does not provide a stop that interacts with the centering sleeve 6a, and in that when the connectors 4a, 4b are completely plugged into one another, the end faces of the two ferrules 5a, 5b butt against one another. By virtue of the setback of the at least one fiber end 9a, 9b, the fiber ends 9a, 9b do not butt against one another, but instead an air gap 15 is still present here between the fiber ends 9a, 9b.

Figure 3:
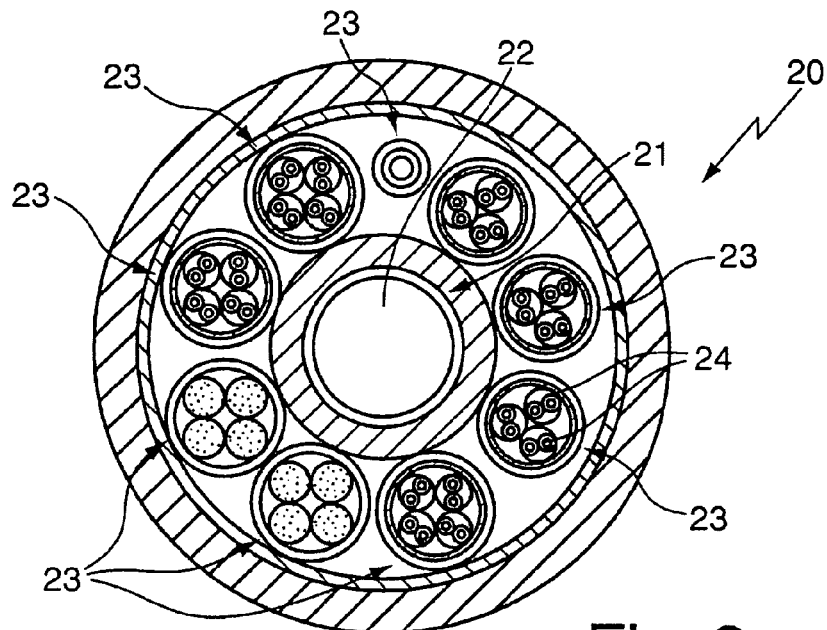
FIG. 3 is a cross-sectional view taken perpendicular to a cable axis of a hybrid cable that can connect with the electro-optical hybrid connection assemblies of FIG. 1 or 2.

FIG. 3 shows a cross-section of a hybrid cable 20, onto which the connectors 4a, 4b can be attached. In the embodiment shown, the hybrid cable 20 has an optical wave guide cable 21 with an optical fiber 22 and integrated safety devices, which in the event of emission of radiation from the guidance area of the fiber or in the event of an incorrectly configured connection assembly 1, prevents a release of laser power, and also a plurality of cables 23 with in each case one or a plurality of electrical conductors (cores) 24.

Figure 4:
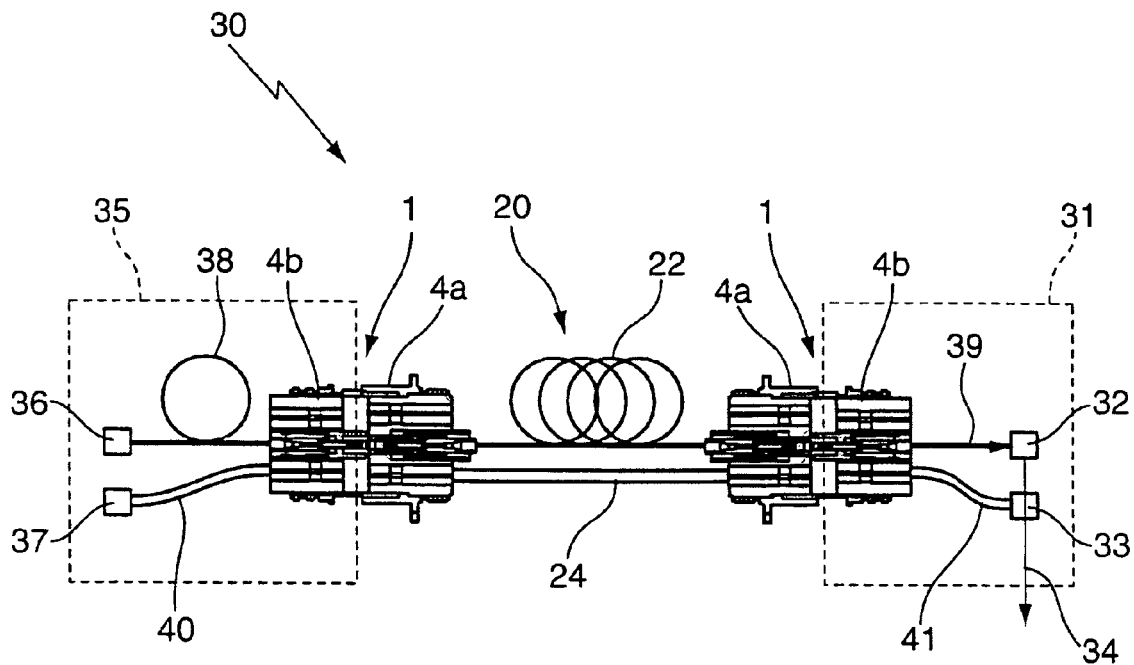
FIG. 4 is a schematic diagram of a laser system with a power supply device and a laser head, which are connected with each other optically and electrically using the hybrid cable of FIG. 3 and the hybrid connection assembly of FIG. 1 or FIG. 2.

FIG. 4 shows schematically the structure of a laser system 30 with a laser head 31, in which are arranged optical components of a laser beam source 32 and e.g., an electrically controlled scanner 33 for the deflection of a laser beam 34 exiting from the laser head 31, and with a separate power supply device 35, in which are arranged a pump light source 36 for the laser beam source 32 and a power supply and control electronics unit 37 for the laser head 31. The laser beam source 32 is, for example, a diode-pumped solid-state laser (e.g., Nd:YAG or Nd:YVO$_4$), whose optical components, such as, e.g., a laser resonator with an output mirror, a rear mirror, and a laser crystal arranged between them, also, if necessary, a Q-switch, a beam dump, and a beam shaper, are arranged in the laser head 31.

The electrical and optical connection of the laser head 31 with the power supply device 35 is effected with the aid of the hybrid cable 20, which with its end-provided connectors 4a is inserted into the connectors 4b provided on the laser head 31 and on the power supply unit 35.

The optical high power transfer section between laser head 31 and power supply device 35 is formed by an optical fiber 38 in the power supply device 35, which leads from the pump light source 36 to the connector 4b of the power supply device 35, by the optical fiber 22 (c.f. FIG. 3) in the hybrid cable 20, which optically connects the two connectors 4a of the hybrid cable 20 with one another, and by an optical fiber 39 in the laser head 31, which leads from the connector 4b of the laser head 31 to the laser beam source 32.

The electrical connection between laser head 31 and the power supply device 35 is formed by electrical conductors 40 in the power supply device 35, which lead from the power supply and control electronics unit 37 to the connector 4b of the power supply device 35, by the electrical conductor 24 in the hybrid cable 20, which electrically connects the two connectors 4a of the hybrid cable 20 with one another, and by electrical conductors 41 in the laser head 31, which lead from the connector 4b of the laser head 31 to, e.g., the scanner 33.

Other implementations are within the scope of the following claims.

For example, in other implementations, the ferrule 5a is guided in the connector housing 10a of the first connector 4a much like the ferrule 5b such that the ferrule 5a can move axially along the fiber axis 8a, and by means of another, the ferrule 5a could be biased in the direction towards an interface between the ferrules 5a and 5b. In other implementations, one or more of the centering sleeve 6a and the shield 12b are movable axially along the fiber axis 8a, 8b and can also be biased with a spring (such as the spring 11b).

What is claimed is:

1. An electro-optical hybrid connection assembly for the optical connection of at least a first optical fiber and a second optical fiber that define a fiber axis and for the electrical connection of at least a first electrical conductor and a second electrical conductor, the assembly comprising:
   a first connector including:
      a first ferrule that encloses the first optical fiber,
      a centering sleeve surrounding the first ferrule and projecting beyond at least one end of the first ferrule, and
      at least one electrical plug-in contact connected to the first electrical conductor; and
   a second connector including:
      a second ferrule enclosing the second optical fiber, and
      at least one electrical plug-in contact connected to the second electrical conductor;
   wherein each of the two optical fibers has a plane fiber end aligned at right angles to the fiber axis and provided with an anti-reflection coating; and wherein in the assembled state of the two connectors, the second ferrule is inserted into the centering sleeve of the first connector such that:
the second ferrule abuts against the centering sleeve or the second ferrule abuts against the first ferrule,
the fiber ends of the two optical fibers are separated from one another by a gap, and
the plug-in contacts of the two connectors are plugged into one another in an electrically conducting manner.

2. The hybrid connection assembly of claim 1, wherein the gap that separates the two fiber ends is an air gap.

3. The hybrid connection assembly of claim 1, wherein at least one of the first and second ferrules terminates flush with the fiber end of the respective fiber that it encloses.

4. The hybrid connection assembly of claim 1, wherein at least one of the first and second ferrules projects beyond the fiber end of the respective fiber that it encloses.

5. The hybrid connection assembly of claim 1, wherein the second ferrule includes a stop that, in the assembled state of the two connectors butts against the centering sleeve of the first connector.

6. The hybrid connection assembly of claim 1, wherein at least one of the first and second ferrules projects beyond the fiber end of the respective fiber that it encloses, and in the assembled state of the two connectors the end faces of the first and second ferrules butt against one another.

7. The hybrid connection assembly of claim 1, wherein at least one of the ferrules or the centering sleeve is guided such that it can move axially against the action of a spring.

8. The hybrid connection assembly of claim 1, wherein the second ferrule is guided such that it can move axially against the action of a spring.

9. The hybrid connection assembly of claim 1, wherein the centering sleeve is a metallic shield.

10. The hybrid connection assembly of claim 9, wherein the centering sleeve is stainless steel or brass.

11. The hybrid connection assembly of claim 1, further comprising a metallic shield surrounding the second ferrule.

12. The hybrid connection assembly of claim 1, wherein the optical fibers are multimode fibers.

13. The hybrid connection assembly of claim 1, wherein the optical fibers are designed for optical powers of at least 10 W.

14. The hybrid connection assembly of claim 1, wherein at least one of the two connectors is attached to a hybrid cable that has at least one optical fiber and at least one electrical conductor.

15. A laser system comprising:
a power supply device including a pump light source that outputs a pump laser beam and an electronics unit that outputs one or more electrical signals;
a connection assembly that receives and transmits the pump laser beam from the pump light source and the one or more electrical signals from the electronics unit, the connection assembly comprising:
a first connector including a first ferrule that encloses a first optical fiber that receives the pump laser beam output from the pump light source, a centering sleeve surrounding the first ferrule and projecting beyond at least one end of the first ferrule, and at least one electrical plug-in contact connected to a first electrical conductor through which the one or more electrical signals are transmitted, and
a second connector including a second ferrule that encloses a second optical fiber and at least one electrical plug-in contact connected to a second electrical conductor,
wherein each of the two optical fibers has a plane fiber end aligned at right angles to an axis of the fibers and when the first and second connectors are connected to each other, the second ferrule is inserted into the centering sleeve such that the second ferrule abuts against the centering sleeve or the first ferrule, the fiber ends of the optical fibers are separated from one another by a gap, and the plug-in contacts are plugged into one another in an electrically conducting manner, and
a laser head including a laser beam source that receives the pump laser beam that has been transmitted through the second optical fiber and an electrical device that receives the one or more electrical signals that have been transmitted through the second electrical conductor.

16. The laser system of claim 15, further comprising another connection assembly.

17. The laser system of claim 15, wherein the optical fibers are multimode fibers.

18. The laser system of claim 15, wherein the optical fibers are designed for optical powers of at least 10 W.

19. The laser system of claim 15, wherein at least one of the two connectors is attached to a hybrid cable that has at least one optical fiber and at least one electrical conductor.

20. The laser system of claim 15, further comprising:
a hybrid cable that includes the second optical fiber and the second electrical conductor; and
a second connection assembly that receives the second optical fiber and the second electrical conductor of the hybrid cable and is designed identically to the connection assembly such that the first optical fiber and the first electrical conductor of the second connection assembly is fed to the laser beam source and the electrical device of the laser head.

* * * * *